US005931273A

United States Patent [19]

Moser

[11] Patent Number: 5,931,273

[45] Date of Patent: Aug. 3, 1999

[54] FLUID COUPLING FOR ENGINE COOLING FAN

[75] Inventor: George Moser, Wixom, Mich.

[73] Assignee: Behr America, Inc., Walled Lake, Mich.

[21] Appl. No.: 08/949,581

[22] Filed: Oct. 14, 1997

[51] Int. Cl.[6] ...................... F16D 35/02

[52] U.S. Cl. ...................... 192/58.42; 192/82 T

[58] Field of Search ...................... 192/58.42, 58.43, 192/58.41, 58.6, 58.61, 58.66, 82 T

[56] References Cited

U.S. PATENT DOCUMENTS

| | | | |
|---|---|---|---|
| Re. 25,481 | 11/1963 | Weir . | |
| 923,565 | 6/1909 | Newcomb | 192/58.41 |
| 1,238,447 | 8/1917 | Severy . | |
| 2,015,626 | 9/1935 | Heath | 192/58.41 |
| 2,073,357 | 3/1937 | Wemp . | |
| 2,720,952 | 10/1955 | Alexandrescu . | |
| 2,988,188 | 6/1961 | Tauschek . | |
| 3,019,875 | 2/1962 | Fowler . | |
| 3,033,334 | 5/1962 | Herbenar . | |
| 3,144,921 | 8/1964 | Martinek . | |
| 3,202,018 | 8/1965 | Hilpert . | |
| 3,262,527 | 7/1966 | Allaben | 192/58.41 |
| 3,323,623 | 6/1967 | Roper | 192/58.43 |
| 3,368,656 | 2/1968 | Hilpert . | |
| 3,380,565 | 4/1968 | Wilkinson | 192/58.41 |
| 3,739,891 | 6/1973 | La Flame | 192/58.43 |
| 3,861,503 | 1/1975 | Nash . | |
| 4,266,645 | 5/1981 | Crooks | 192/58.43 |
| 4,278,159 | 7/1981 | Roth et al. . | |
| 4,282,960 | 8/1981 | Glasson et al. . | |
| 4,650,045 | 3/1987 | Weible et al. . | |
| 4,938,331 | 7/1990 | Ohmi et al. . | |
| 4,962,837 | 10/1990 | Teraoka . | |
| 5,117,955 | 6/1992 | Kikuchi | 192/82 T X |
| 5,165,506 | 11/1992 | Guimbretiere | 192/58.42 X |
| 5,307,727 | 5/1994 | Berger et al. . | |
| 5,433,304 | 7/1995 | Bojas . | |
| 5,584,371 | 12/1996 | Kelledes et al. | 192/58.61 |

*Primary Examiner*—Rodney H. Bonck
*Attorney, Agent, or Firm*—Howard & Howard

[57] ABSTRACT

A fluid coupling assembly for driving a cooling fan from an engine comprising a housing (10) defining a fluid chamber (12) having a volume and a drive member rotatably supported in the fluid chamber (12) of the housing (10) for transmitting torque between the housing (10) and the drive member through the shearing action of fluid (14) in the chamber (12). In some embodiments the housing (10) is adapted to drive the fan with the drive member adapted for connection to the engine and in the other embodiments the housing (10) is driven by the engine and the drive member is adapted for connection to the fan. A displacement device means is disposed in the fluid chamber (12) for adjusting the volume of the said chamber (12) to vary the coverage of the drive member by the fluid (14) to vary the shearing action of the fluid (14) to adjust the torque transmitted between the drive member and the housing (10). The assembly is characterized by the displacement devices including a threaded male element (44, 144, 244, 344, 444) and a threaded female element (46, 146, 246, 346, 446) for adjusting the volume of the chamber (12) in response to rotation of the male element relative to the female element, and a motor for rotating the threaded male element (44, 144, 244, 344, 444). The assembly also includes a computer (54) for controlling the motor for rotating the threaded male element (44, 144, 244, 344, 444) in response to various operating conditions.

12 Claims, 6 Drawing Sheets

18
10
20
20
16

10
16
144
20
21
20
144
146
146
150
150
148
148

226
10
80
182
70
84
78
74
221
244
246
250
72
248

FLUID COUPLING FOR ENGINE COOLING FAN

BACKGROUND OF THE INVENTION

1. Field of the Invention

The subject invention relates to fluid coupling for transmitting torque between a vehicular engine and a cooling fan.

2. Description of the Prior Art

A wide variety of combinations are known for varying the amount of torque transmitted between the engine and cooling fan of an automotive vehicle. Such units typically include a housing defining a chamber in which a member rotates with a fluid in the chamber to act in shear to transmit torque between the housing and the member. The amount of fluid in the chamber determines the amount of shear and therefore the amount torque transmitted. To this various devices are utilized to vary the amount of fluid in the chamber. However, there remains a use for a simplified component to vary the fluid available for the shearing action.

SUMMARY OF THE INVENTION AND ADVANTAGES

A fluid coupling assembly for driving a cooling fan from an engine comprising a housing defining a fluid chamber having a volume and a drive member rotatably supported in the fluid chamber of the housing for transmitting torque between said housing and the drive member through the shearing action of fluid in the chamber. One of the housing and the drive member is adapted for connection to the engine and the other of the housing and the drive member is adapted for connection to the fan. A displacement means is disposed in the fluid chamber for adjusting the volume of the chamber to vary the coverage of the drive member by the fluid to vary the shearing action of the fluid to adjust the torque transmitted between the drive member and the housing. The assembly is characterized by the displacement means including a threaded male element and a threaded female element for adjusting the volume of the chamber in response to rotation of the male element relative to the female element, and a motor for rotating the threaded male element.

The invention is also characterized by a method of varying the torque output of a fluid coupling disposed between the engine and cooling fan of a vehicle wherein fluid is disposed in a chamber for shearing action between a driven member and a housing and the volume of the chamber is varied to adjust the shearing action and the torque transmitted between a driven member and a housing; said method comprising the steps of computing a control signal with a computer in response to at least two inputs from the group of; ambient temperature, engine coolant temperature, engine oil temperature, cylinder head temperature, transmission oil temperature, and operating status of the air conditioner; and adjusting the volume of said chamber in response to said control signal from said computer to vary the coverage of said driven member by the fluid to vary the shearing action of the fluid to adjust the torque transmitted between the driven member and the housing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
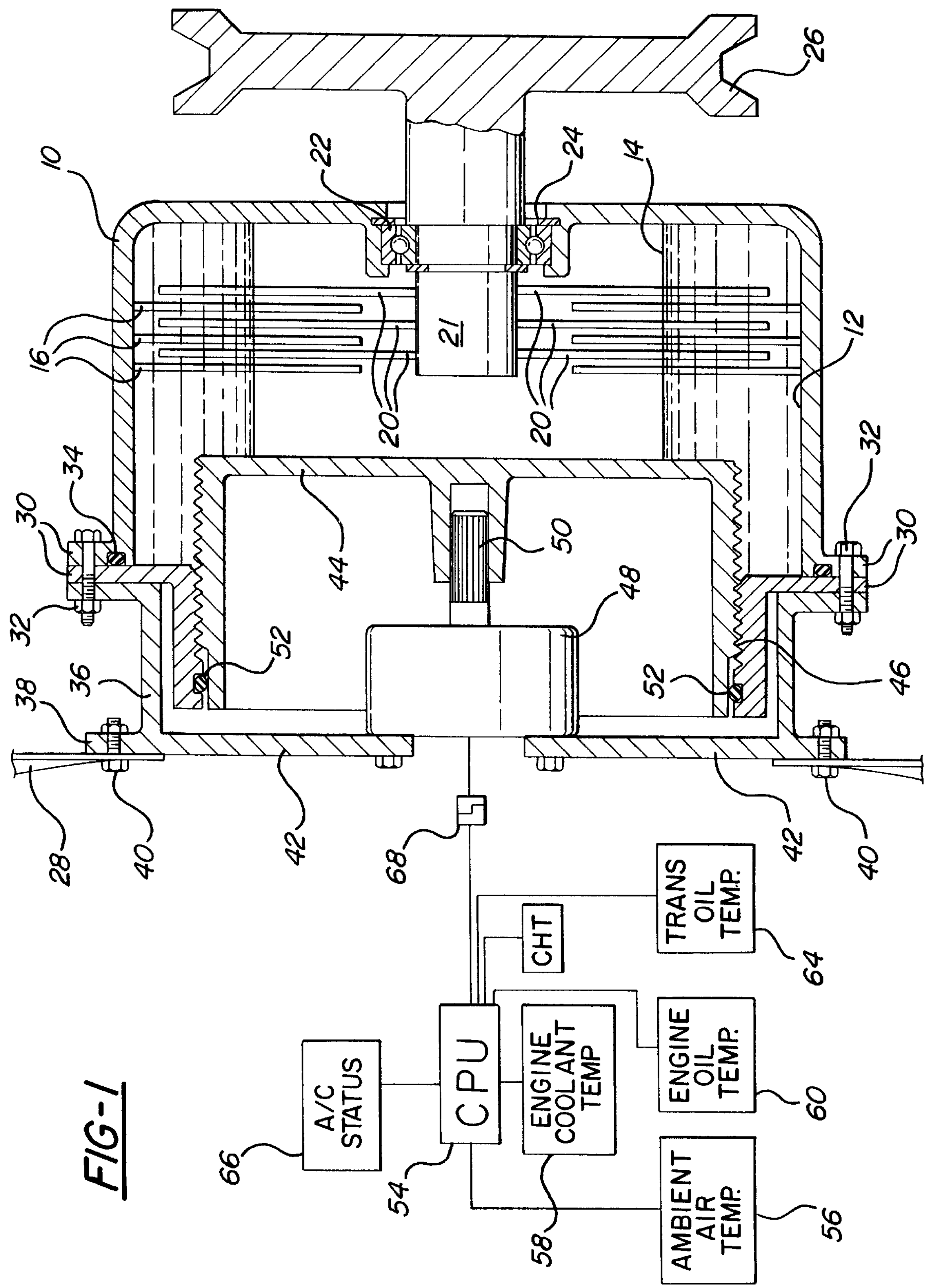
FIG. 1 is a cross sectional view of a first embodiment.

Referring to the Figures, wherein like numerals indicate like or corresponding parts throughout the several views, a first embodiment of fluid coupling assembly for driving a cooling fan from an engine is shown in FIG. 1.

Figure 2:
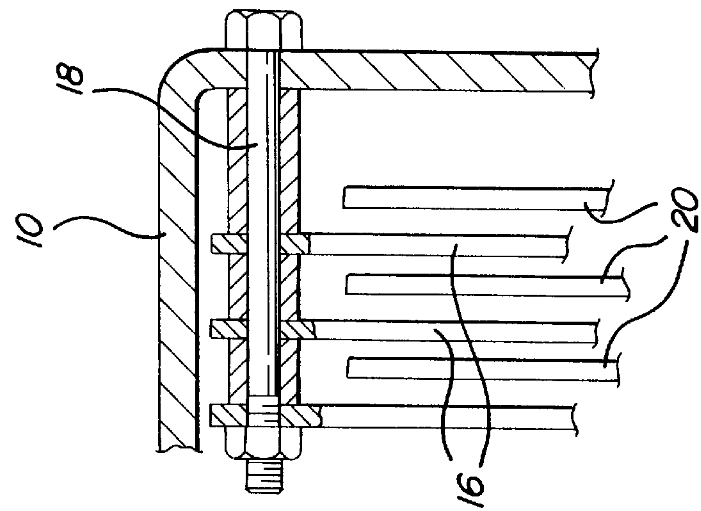
FIG. 2 is an enlarged cross sectional view showing an attachment of the plurality of discs to the housing.

The fluid coupling assembly of FIG. 1 comprises a housing 10 defining a fluid chamber 12 having a volume and containing a transmission fluid 14. A first plurality of discs 16 are supported by the housing 10 for rotation therewith. The discs are attached to the housing 10 by a bolt assembly 18 as shown in FIG. 2.

A drive member is rotatably supported in the fluid chamber 12 of the housing 10 for transmitting torque between the housing 10 and the drive member through the shearing action of fluid 14 in the chamber 12. The drive member includes a second plurality of discs 20 interleaved with the first plurality of discs 16 for transmitting torque between the first and second plurality of discs 20 through the shearing action of fluid 14 in the housing 10. The drive member also includes a pulley shaft 21 rotatably supported in the housing 10 by a bearing 22, which is retained in the housing 10 by a snap ring 24. The second plurality of discs 20 are secured to the pulley shaft 21 for rotation therewith.

One of the housing 10 and the drive member is adapted for connection to the engine and the other of the housing 10 and the drive member is adapted for connection to the fan. In the embodiment of FIG. 1, the pulley shaft 21 supports a pulley 26 of the type well known in the art for being driven from the engine by a V-belt and the housing 10 is adapted to drive a fan 28. More specifically, the housing 10 comprises two components having mating flanges 30 which are secured together by bolts 32. A fluid seal 34 is disposed between the flanges 30 to prevent fluid 14 leakage. A bracket 36 has a flange sandwiched with the flanges 30 of the housing 10 and extends from the housing 10 to a radially outwardly projecting flange 38, to which the fan 28 is bolted by bolts 40, and an inwardly projecting flange 42.

The assembly includes a displacement means in the fluid chamber 12 for adjusting the volume of the chamber 12 to vary the coverage of the drive member by the fluid 14 to vary the shearing action of the fluid 14 to adjust the torque transmitted between the drive member and the housing 10. The assembly is characterized by this displacement means including a threaded male element 44 in threaded engagement with a threaded female element or bore 46 defined by the housing 10 for adjusting the volume of the chamber 12 in response to rotation of the male element relative to the female element 46, and a motor 48 for rotating the threaded male element 44. The motor 48 is supported by the housing 10 through the flange 42 of the bracket for rotation therewith. A telescoping connection 50 is disposed between the motor 48 and the threaded male element 44 for rotating the threaded male element 44 by the motor 48 while allowing displacement of the displacement means toward and away from the motor 48. The telescoping connection 50 comprises a male spline extending from the motor 48 and slidably disposed in a female spline connected to the male threaded element. Therefore, as the motor 48 rotates the male spline to rotate the female spline, the female spline moves longitudinally along the male spline as the threaded male element 44 moves into and out of the housing 10. In other words, the threaded male element 44 threadedly engages the bore 46 and extends into the chamber 12 for movement into and out of the chamber 12 upon rotation thereof by the motor 48. A seal 52 is disposed between the threaded male element 44 and the bore of the housing 10 for preventing fluid 14 leakage around the threaded male element.

Obviously, when there is no fluid 14 in the chamber 12, there is no shearing action between the first and second plurality of discs 20. Conversely, the greater the coverage of fluid 14 between the first and second plurality of discs 20, the greater the shearing action and the greater the amount of torque transmitted between the first and second plurality of discs 20.

The assembly also includes a computer or central processing unit (CPU) 54 for controlling the motor 48 for rotating the threaded male element 44 in response to various operating conditions. The computer 54 is responsive to at least two inputs of; ambient temperature, engine coolant temperature, engine oil temperature, cylinder head temperature, transmission oil temperature, and operating status of the air conditioner, for integrating the inputs. An ambient temperature probe 56 feeds ambient temperature to the computer 54. An engine coolant temperature probe 58 feeds the computer 54 the temperature of the coolant in the engine whereby the shearing action of the assembly is increased when the coolant temperature increases. An engine oil temperature probe 60 feeds the computer 54 the temperature of the engine oil. A cylinder head temperature probe 62 provides the computer 54 the cylinder head temperature. A transmission oil temperature probe 64 provides the computer 54 the transmission oil temperature. And the operating status of the air conditioner is provided by an A/C analyzer 66. The output of the computer 54 may be fed to the motor 48 through a commutator 68, or via light transmission.

Figure 3:
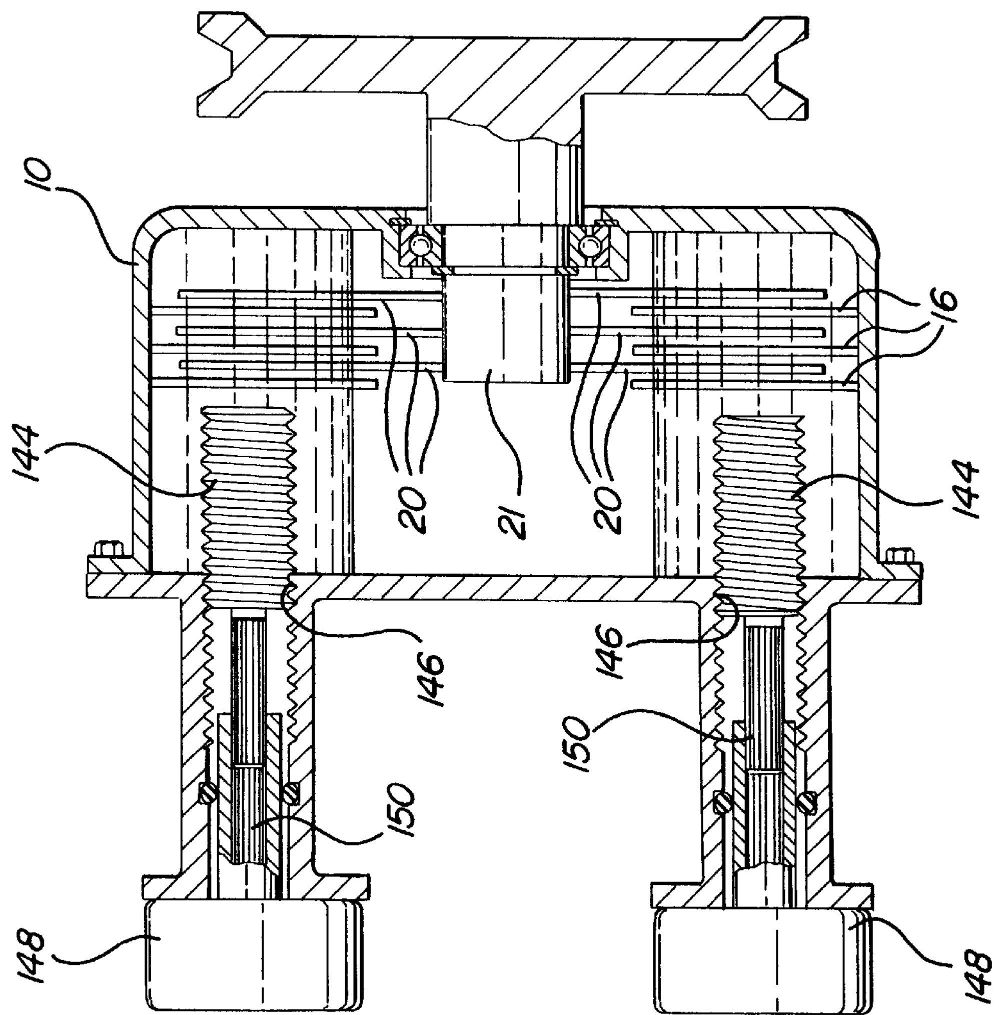
FIG. 3 is a cross sectional view of a second embodiment.

The embodiment of FIG. 3 differs from that of FIG. 1 by including a plurality of the bores 146 and a plurality of the threaded male elements 144 with each of the threaded male elements 144 comprising a bolt. Each bolt 144 is rotated by a motor 148 through a splined connection 150.

Figure 4:
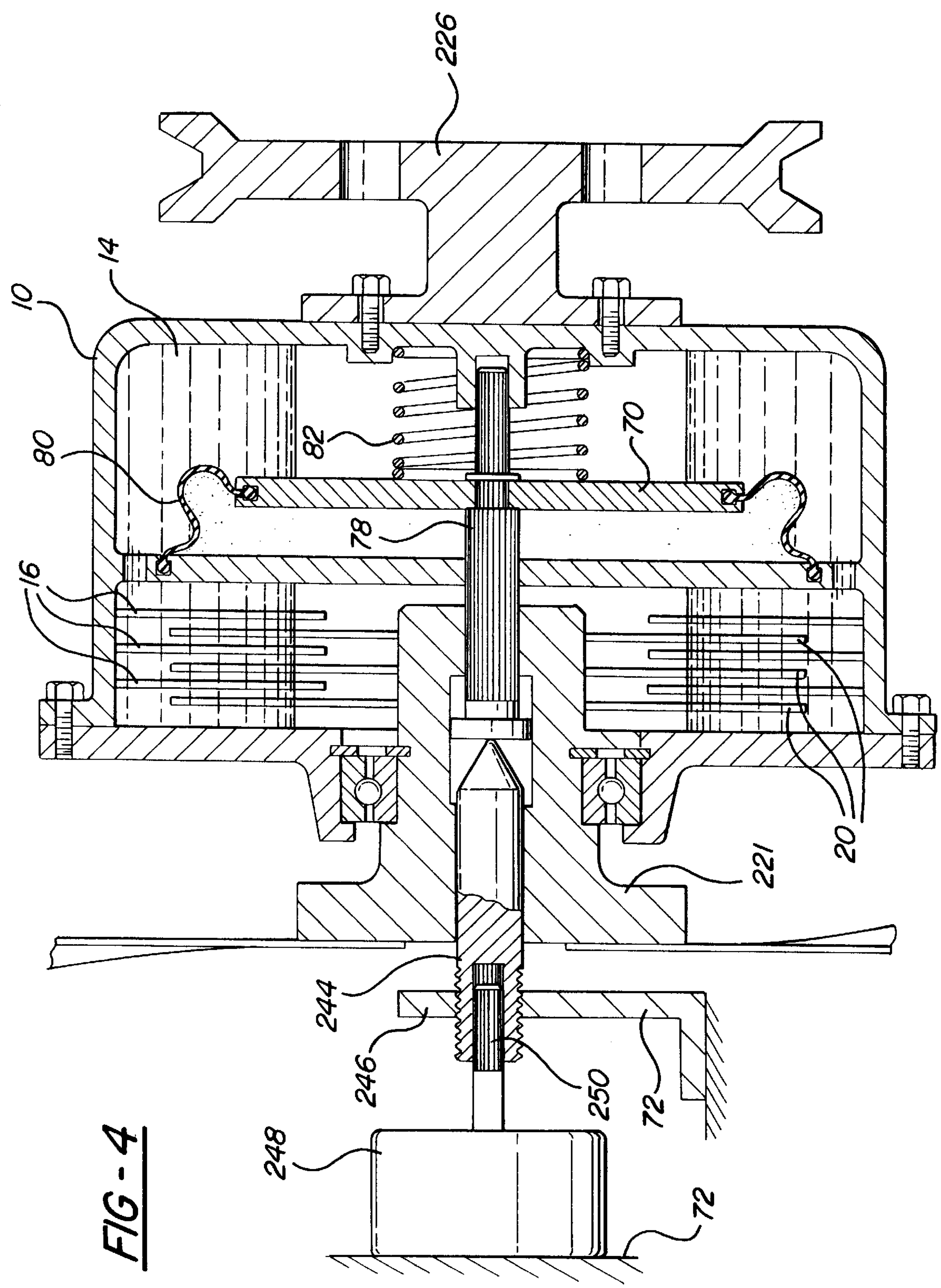
FIG. 4 is a cross sectional view of a third embodiment.

The embodiment of FIG. 4 differs from the previous embodiments in that the housing 10 is driven by the engine and the drive member is operatively connected to the fan 28. A movable wall or plate 70 is disposed in the chamber 12 for varying the volume and the threaded element 244 is operatively connected to the movable wall 70 for varying the volume upon rotation of the threaded male element 244. The motor 248 and the threaded female element 246 are adapted for support by a stationary structure 72, i.e., the vehicle body. A shaft 221 is operatively connected to a fan 28 and is rotatably supported in a bearing 74 in the housing 10. The housing 10 is in driving engagement with the engine through a pulley 226 which is welded or otherwise secured to the housing 10 for rotation therewith. The housing 10 supports an inner wall or spider which, in turn, slidably supports a pusher rod 78. The inner wall or spider has holes therethrough for the free passage of fluid form side to side. The pusher rod 78 is attached to and supports the movable wall, the movable wall being part of a flexible diaphragm 80. A biasing spring 82 acts against the threaded male element 244 for changing the volume of the chamber 12 in the housing 10 upon movement of the threaded male element 244 by the motor 248, the motor being in driving engagement with the threaded male element 244 through the splined connection 250.

Figure 5:
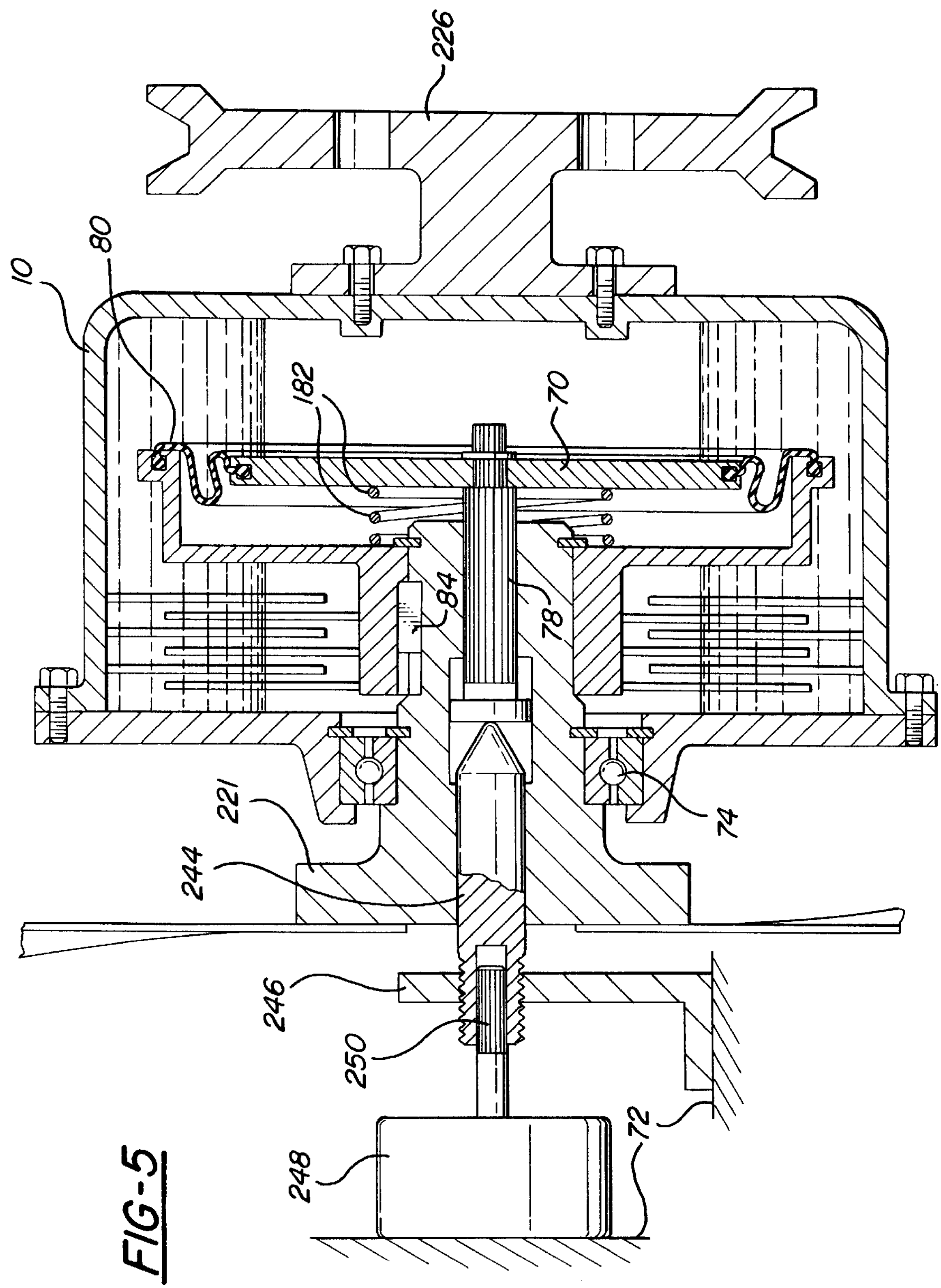
FIG. 5 is a cross sectional view of a fourth embodiment.

The embodiment of FIG. 5 differs from the embodiment of FIG. 4 in that the inner wall or spider is replaced with a plate which supports the diaphragm 80 but is movable with the shaft 221 to which it is keyed by a key 84. The spring 182 is disposed on the opposite side of the wall 70 of the diaphragm to pull the diaphragm inwardly so that, when the motor 248 rotates the threaded male element 244, the rod 78 pushes the diaphragm 80 outwardly against the action of the spring 182.

Figure 6:
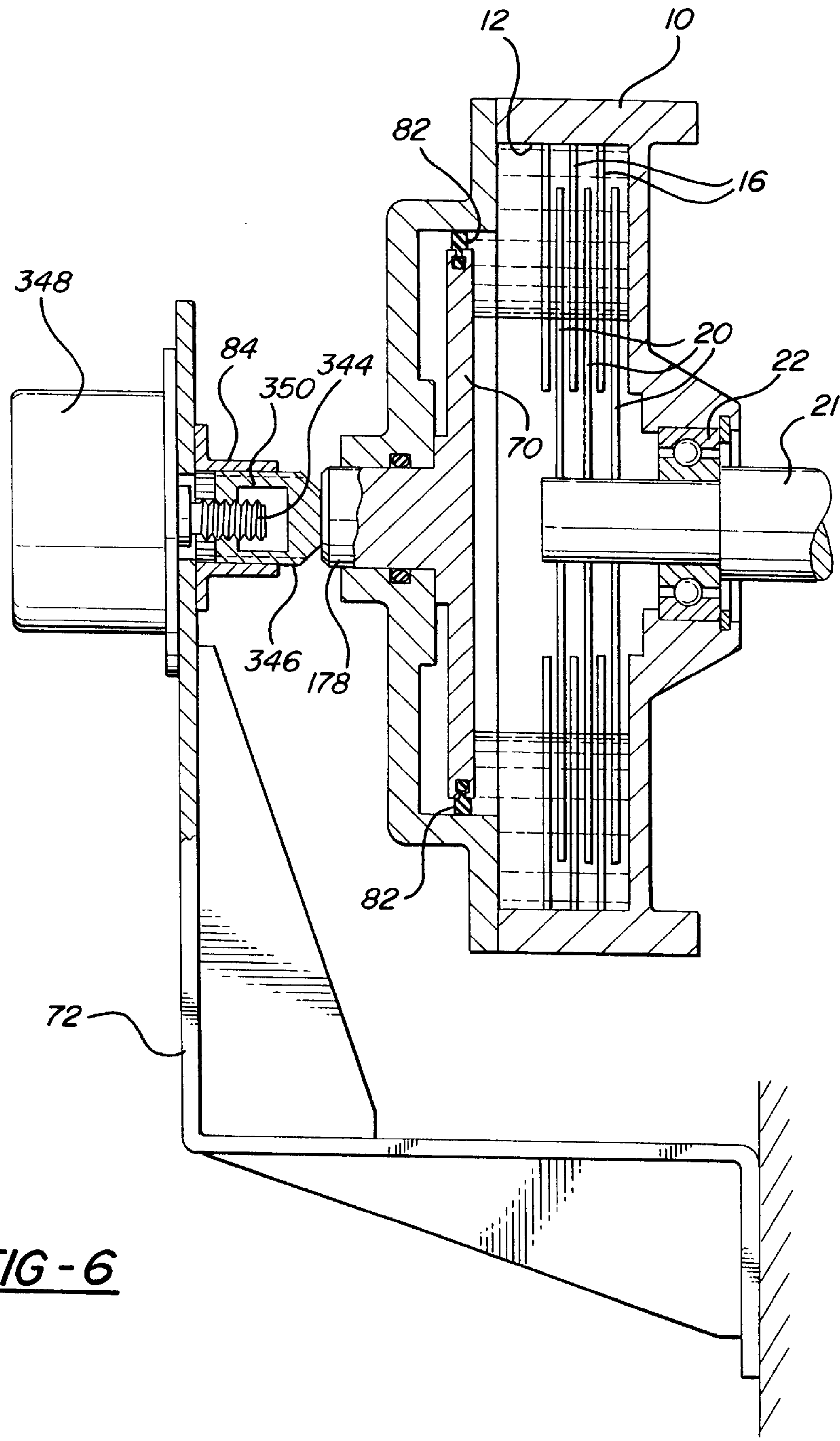
FIG. 6 is a cross sectional view of a fifth embodiment.

In the embodiment of FIG. 6, the movable wall 70 supports a seal 82 so that the wall 70 is in sealing engagement with the interior of the housing 12. In addition, the shaft 344 extending from the stepper motor 348 is the male threaded member and threadedly engages the female threaded member 346, which is a bullet-shaped member having a nose in bearing engagement with the shaft 178 which supports the movable wall 70. The bullet-shaped member 346 is splined 350 to a collar 84 which is part of the support structure 72. Therefore, as the stepper motor 348 rotates the male threaded member 344, the bullet-shaped female member 346 moves rectilinearly because it is prevented from rotating by its splined connection 350 to the support structure.

Figure 7:
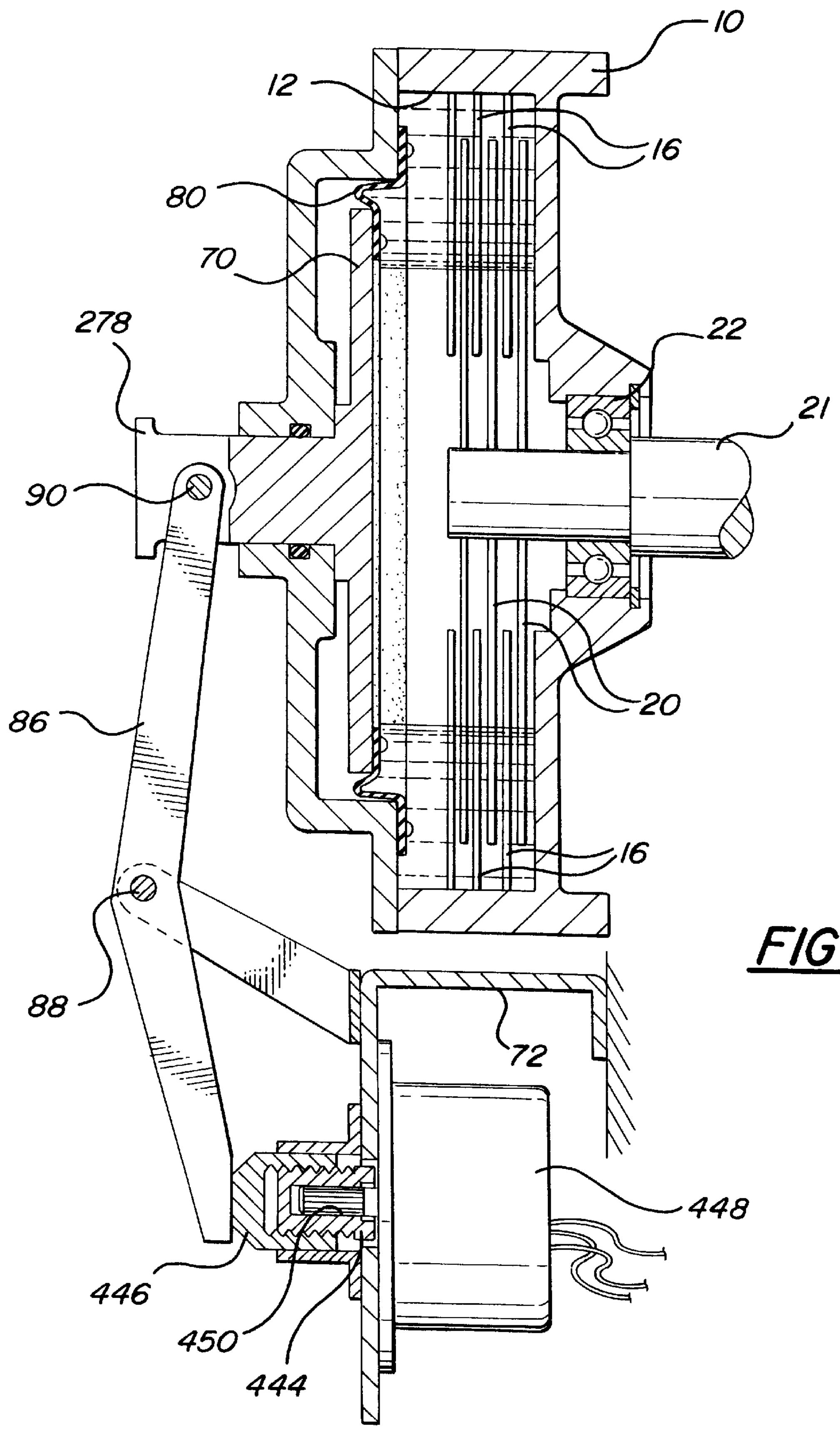
FIG. 7 is a cross sectional view of a sixth embodiment.

The embodiment of FIG. 7 is similar to the embodiment of FIG. 6, except that the shaft 450 extending from the stepper motor 448 is splined to the male threaded member 444 which is, in turn, in threaded engagement with the female bullet-shaped member 446. The male threaded member 444 is operatively connected to the movable wall 70, 80 by a lever 86 which is pivotally supported by the support structure 72 at a pivot pin 88. One end of the lever 86 is in bearing engagement with the female member 446 while the other end is pivotally connected by a pin 90 to the shaft 278 of the movable wall 70, 80. The embodiment of FIG. 7 uses a diaphragm 80 but could use a seal instead, as illustrated in FIG. 6. As will be appreciated, the seal 82 could be used in various of the previous embodiments.

The invention also includes a method of varying the torque output of a fluid coupling disposed between the engine and cooling fan 28 of a vehicle wherein fluid 14 is disposed in a chamber 12 for shearing action between a driven member and a housing 10 and the volume of the chamber 12 is varied to adjust the shearing action and the torque transmitted between a driven member and a housing 10. The method comprises the steps of computing a control signal with a computer 54 in response to at least two inputs from the group of; ambient temperature, engine coolant temperature, engine oil temperature, cylinder head temperature, transmission oil temperature, and operating status of the air conditioner; and adjusting the volume of the chamber 12 in response to the control signal from the computer 54 to vary the coverage of the driven member by the fluid 14 to vary the shearing action of the fluid 14 to adjust the torque transmitted between the driven member and the housing 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid coupling assembly for driving a cooling fan from an engine comprising:

a housing (10) defining a fluid chamber (12) having a volume;

a drive member rotatably supported in the fluid chamber (12) of the housing (10) for transmitting torque between said housing (10) and said drive member through the shearing action of fluid (14) in said chamber (12);

one of said housing (10) and said drive member adapted for connection to the engine and the other of said housing (10) and said drive member adapted for connection to the fan (28);

a displacement means in said fluid chamber (12) for adjusting the volume of said chamber (12) to vary the coverage of said drive member by the fluid (14) to vary the shearing action of the fluid (14) to adjust the torque transmitted between said drive member and said housing (10);

said assembly characterized by said displacement means including a threaded male element (44, 144, 244, 344, 444) and a threaded female element (46, 146, 246, 346, 446) for adjusting said volume of said chamber (12) in response to rotation of said male element relative to said female element (46, 146, 246, 346, 446), and a motor (48, 148, 248, 348, 448) for rotating said threaded male element (44, 144, 244, 344, 444).

2. An assembly as set forth in claim 1 including a telescoping connection (50, 150, 250, 350, 450) between said motor (48, 148, 248, 348, 448) and said threaded male element (44, 144, 244, 344, 444) for rotating said threaded male element (44, 144, 244, 344, 444) by said motor (48, 148, 248, 348, 448) while allowing displacement of said displacement means toward and away from said motor (48, 148, 248, 348, 448).

3. An assembly as set forth in claim 2 wherein said motor (48, 148) is supported by said housing (10) for rotation therewith.

4. An assembly as set forth in claim 3 wherein said threaded male element (44, 144) is in threaded engagement with said housing (10).

5. An assembly as set forth in claim 4 wherein said housing (10) has a threaded bore defining said female threaded element and said threaded male element (44, 144) threadedly engages said bore and extends into said chamber (12) for movement into and out of said chamber (12) upon rotation thereof.

6. An assembly as set forth in claim 5 including a seal between said threaded male element (44, 144) and said bore of said housing (10) for preventing fluid (14) leakage around said threaded male element (44, 144).

7. An assembly as set forth in claim 5 including a plurality of said bores and a plurality of said threaded male elements (144) with each of said threaded male elements comprising a bolt.

8. An assembly as set forth in claim 2 wherein said motor (248, 348, 448) and said threaded female element (246, 346, 446) are adapted for support by a stationary structure (72).

9. An assembly as set forth in claim 8 wherein said housing (10) is driven by the engine and the drive member is operatively connected to the fan (28), a movable wall (70, 80) disposed in said chamber (12) for varying said volume, said threaded male element (244, 344, 444) operatively connected to said movable wall (70, 80) for varying said volume upon rotation of said threaded male element (244, 344, 444).

10. An assembly as set forth in claim 2 including a computer (54) for controlling said motor (48, 148, 248) for rotating said threaded male element (44, 144, 244, 344, 444) in response to various operating conditions.

11. An assembly as set forth in claim 10 wherein said computer (54) is responsive to at least two inputs of; ambient temperature, engine coolant temperature, engine oil temperature, cylinder head temperature, transmission oil temperature, and operating status of the air conditioner, for integrating the inputs.

12. An assembly as set forth in claim 2 including a first plurality of discs (16) supported by said housing (10) for rotation therewith, said drive member including a second plurality of discs (20) interleaved with said first plurality of discs (16) for transmitting torque between said first and second plurality of discs (16, 20) through the shearing action of fluid (14) in said housing (10).

* * * * *